(12) United States Patent
Stumpf et al.

(10) Patent No.: US 10,594,864 B2
(45) Date of Patent: *Mar. 17, 2020

(54) SYSTEM AND METHOD FOR ADVANCED CAMPAIGN MANAGEMENT

(71) Applicant: INTERACTIVE INTELLIGENCE GROUP, INC., Indianapolis, IN (US)

(72) Inventors: Mark R. Stumpf, Carmel, IN (US); Chad McCormick, Draper, UT (US); Brian Wolfe, Indianapolis, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/945,632

(22) Filed: Apr. 4, 2018

(65) Prior Publication Data

US 2018/0332168 A1    Nov. 15, 2018

Related U.S. Application Data

(63) Continuation of application No. 15/410,846, filed on Jan. 20, 2017, now Pat. No. 9,979,821.

(60) Provisional application No. 62/280,735, filed on Jan. 20, 2016.

(51) Int. Cl.
H04M 3/51 (2006.01)

(52) U.S. Cl.
CPC ........ H04M 3/5158 (2013.01); *H04M 3/5183* (2013.01); *H04M 2203/2072* (2013.01); *H04M 2203/256* (2013.01); *H04M 2203/401* (2013.01)

(58) Field of Classification Search
CPC ............. H04M 3/4878; H04M 3/5158; H04M 3/5175; H04M 2203/256; H04M 2242/18; H04M 2203/401; H04M 3/5183; H04M 2203/2072

USPC ....................................... 379/266.07, 266.08
See application file for complete search history.

(56) References Cited

U.S. PATENT DOCUMENTS

| | | | |
|---|---|---|---|
| 7,046,789 B1 | 5/2006 | Anderson et al. | |
| 8,917,859 B1 | 12/2014 | Brimshan et al. | |
| 8,995,648 B1 | 3/2015 | Gibbs et al. | |
| 9,172,798 B1 | 10/2015 | Ouimette et al. | |
| 9,979,821 B2* | 5/2018 | Stumpf | H04M 3/5158 |
| 2003/0016812 A1 | 1/2003 | Rodenbusch et al. | |
| 2004/0133434 A1 | 7/2004 | Szlam et al. | |

(Continued)

OTHER PUBLICATIONS

International Preliminary Report for Application No. PCT/US17/14225, dated Jan. 17, 2018, 10 pages.

(Continued)

*Primary Examiner* — Harry S Hong

(57) ABSTRACT

A system and method are presented for advanced campaign management in outbound dialing platforms. In a contact center environment, a dialing campaign may be configured such that the outbound dialing platform modifies its behavior automatically throughout the dialing campaign as conditions change. Dialing campaigns may be constructed from groups, which are organized into a campaign sequence. As the campaign sequence flows between groups, details of the campaign may be monitored and evaluated by the platform. Group transitions may be initiated based on activation triggers. In an embodiment, campaign sequences may also be automatically transitioned to new campaign sequences, paused, or reset based on activation triggers. A transition may also be initiated by manual override of the platform.

19 Claims, 4 Drawing Sheets

(56) References Cited

U.S. PATENT DOCUMENTS

2015/0249746 A1    9/2015   Segall
2017/0230503 A1*   8/2017   Stumpf ............... H04M 3/5158

OTHER PUBLICATIONS

International Search Report and Written Opinion for Application No. PCT/US17/14225, dated Apr. 7, 2017, 7 pages.
Australian Government Office Action for Application No. 2017209212, dated Mar. 18, 2019, 4 pages.
Extended European Search Report for Application No. 17741968.6, dated Nov. 9, 2018, 9 pages.
New Zealand Intellectual Property Office Further Examination Report for Application No. 745039, dated May 23, 2019, 3 pages.
New Zealand Intellectual Property Office First Examination Report for Application No. 745039, dated Dec. 5, 2018, 4 pages.
Canadian Office Action for Application No. 3,014,450, dated May 31, 2019, 5 pages.
New Zealand Intellectual Property Office Further Examination Report for Application No. 745039, dated Aug. 12, 2019, 5 pages.
New Zealand Intellectual Property Office Further Examination Report for Application No. 745039, dated Oct. 29, 2019, 4 pages.

* cited by examiner

SYSTEM AND METHOD FOR ADVANCED CAMPAIGN MANAGEMENT

CROSS-REFERENCE TO RELATED APPLICATIONS

This application is a continuation of U.S. patent application Ser. No. 15/410,846, filed on Jan. 20, 2017, which claims the benefit of U.S. Provisional Application No. 62/280,735, filed on Jan. 20, 2016, the content of all of which are incorporated herein by reference.

BACKGROUND

The present invention generally relates to telecommunications systems and methods, as well as platforms for outbound dialing. More particularly, the present invention pertains to dialing campaigns conducted by contact centers.

SUMMARY

A system and method are presented for advanced campaign management in outbound dialing platforms. In a contact center environment, a dialing campaign may be configured such that the outbound dialing platform modifies its behavior automatically throughout the dialing campaign as conditions change. Dialing campaigns may be constructed from groups, which are organized into a campaign sequence. As the campaign sequence flows between groups, details of the campaign may be monitored and evaluated by the platform. Group transitions may be initiated based on activation triggers. In an embodiment, campaign sequences may also be automatically transitioned to new campaign sequences, paused, or reset based on activation triggers. A transition may also be initiated by manual override of the platform.

In one embodiment, a method is presented for management of outbound dialing campaigns in a contact center system, wherein the contact center system comprises an outbound dialing platform, the method comprising the steps of: configuring an automated dialing campaign sequence for the outbound dialing platform, wherein the campaign sequence comprises a plurality of groups; arranging the plurality of groups within the campaign sequence; initiating the campaign sequence with the outbound dialing platform, wherein the campaign sequence flows between groups; monitoring, by the outbound dialing platform, the campaign sequence as the campaign sequence flows; and automatically triggering a campaign sequence transition based on the monitoring of the sequence.

In another embodiment, a method is presented for management of an outbound dialing campaign in a contact center system, wherein the contact center system comprises an outbound dialing platform, the method comprising the steps of: configuring, by a user through a user interface, an automated dialing campaign for the outbound dialing platform, wherein the configuring comprises creating at least one sequence, wherein the at least one sequence comprises one or more groups; arranging the one or more groups within the at least one sequence based on desired sequence flow; initiating, by the user, a first sequence, wherein the outbound dialing platform automatically conducts the dialing campaign; monitoring, by the outbound dialing platform, the dialing campaign as the dialing campaign flows from a first group to a next group in the arrangement of one or more groups within the first sequence; and automatically triggering a transition based on the monitoring of the first sequence.

CROSS-REFERENCE TO RELATED APPLICATIONS

This application claims priority to U.S. provisional application 62/280,735 filed Jan. 20, 2016, also entitled "System and Method for Advanced Campaign Management," the contents of which are incorporated herein.

DETAILED DESCRIPTION

Figure 1:
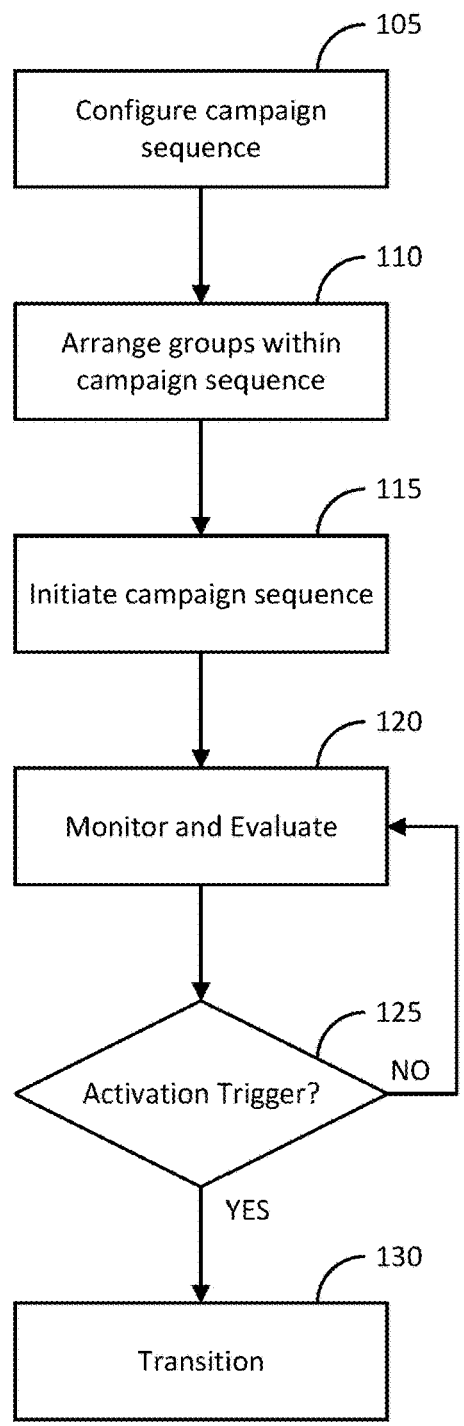
FIG. 1 is a flowchart illustrating an embodiment of a process for managing a campaign sequence.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A system and method for advanced campaign management are presented for use in an outbound dialing platform. The outbound dialing platform might comprise an automated dialer, or an outbound dialer, configured to conduct outbound dialing campaigns in a contact center environment. The outbound dialing platform might comprise automated predictive dialing, manual calling, and campaign management capabilities. In an embodiment, the outbound dialing platform is integrated into the contact center system, supporting outbound campaigns. In an embodiment, the outbound dialing platform may run on a server is connected to a campaign server, which provides and logs information related to the outbound dialing platform and the contact center system. The campaign server may also house the dialing platform configurations, such as database connections and contact lists. In an embodiment, the outbound dialing platform may be SIP-based for support in a VoIP environment.

The outbound dialing platform may be used by a contact center worker (e.g., agent, supervisor, administrator, etc.) to configure dialing campaigns. Dialing campaigns may be configured such that they automatically modify behavior through the campaign as conditions change, such as staff changes, time of day, to name a couple non-limiting examples.

The dialing campaigns comprise one or more sequences, wherein the sequences are comprised of one or more groups. Dialing campaign groups may be user constructed, or based on a default provided by the platform. The dialing campaign groups may be constructed on a time-based strategy for the contact center, such as for a day or week. If goals are met, a different campaign may be transitioned to. Examples of goals might comprise number of successes or right party contacts. Each group may have the same set of campaign properties; however, each individual property may have a different value. The values of the campaign properties in each group are capable of adjustment. Examples of campaign properties might comprise a time zone, a filter, an abandon rate calculation, agentless actions (e.g., an action for an answering machine, a fax action, a liver person action), an auto pace limit, etc., to name a few non-limiting examples. Using the time zone property as an example, the value might comprise "eastern only" or "mountain only".

Campaign groups may be arranged in a sequence so that the flow of the campaign moves from group to group. The flow may be based on activation triggers wherein the triggers may be based on time, events, or statistics. Dialing campaigns may thus be reorganized to function like a workflow to improve contact center efficiency. As a campaign sequence is conducted, details of the campaign may be monitored and evaluated as a campaign sequence flows in real-time.

FIG. 1 is a flowchart illustrating an embodiment of a process for managing a campaign sequence, indicated generally at 100. The process 100 occurs in the outbound dialing platform of the contact center system.

Figure 2:
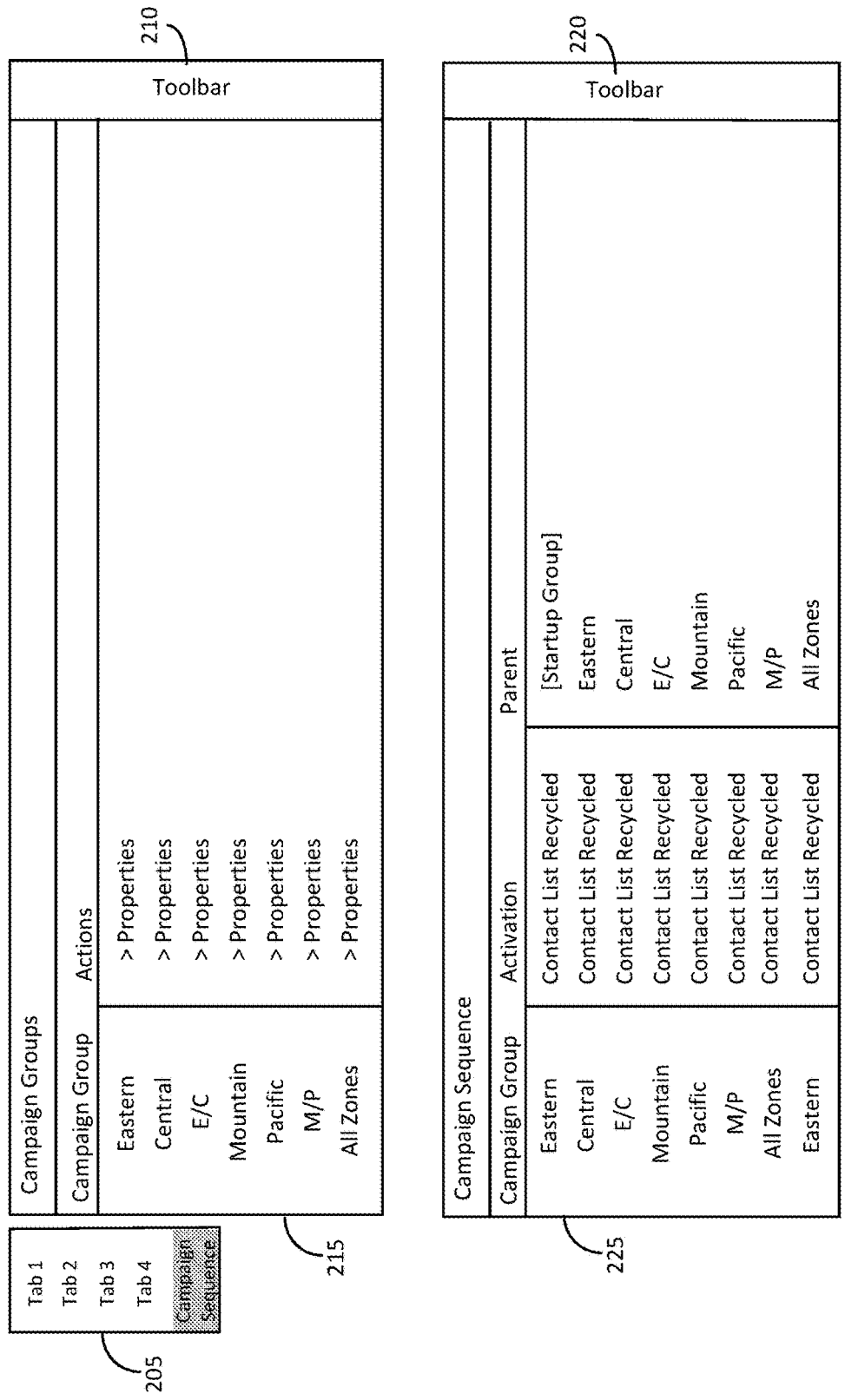
FIG. 2 is a diagram illustrating an embodiment of a campaign sequence.

In operation 105, a campaign sequence is configured. For example, a user may configure a campaign sequence for an outbound dialing campaign. This may be performed through a user interface in the outbound dialing platform. FIG. 2 is a diagram illustrating an embodiment of a campaign sequence. A user may be able to configure a campaign sequence through a user interface, indicated generally at 200.

Different sections may be provided for performing actions 205, which are accessed through a number of tabs. In an embodiment, a campaign sequence may be configured through the campaign sequence tab, which is selected. As a result of selecting the campaign sequence tab, sections may appear, such as: a toolbar for creating and configuring campaign groups 210, a campaign group section for displaying the campaign groups created 215, a toolbar for creation and configuration of a campaign sequence 220, and a campaign sequence section which displays the campaign groups in the desired flow. It should be noted that the illustrations provided in FIG. 2 are for example purposes only and not intended to be limiting.

Using the sections generally presented in FIG. 2, a user is able to view, create, and configure dialing campaigns. The campaign groups section 215 displays information relating to the created campaign groups and actions which may be associated with each campaign group. As campaign groups are created, they appear in the campaign groups section 215 of the user interface. Additional campaign groups may be created using the commands present in the toolbar 210. The campaign group section 215 may also display to the user the campaign groups in the order the user would like them to flow and may be moved around both manually by the user and automatically by the outbound dialing platform as the campaign sequence progresses. In this example, existing campaign groups which have been created comprise: Eastern, Central, E/C, Mountain, Pacific, M/P, and All Zones.

Actions associated with each campaign group may allow the user to modify the group. For example, 'Properties' are editable under 'Actions'. Properties may be added to the campaign group, such as "abandon rate calculation", agentless actions (e.g., an action for an answering machine, a fax action, a liver person action), an auto pace limit, time zone, etc., to name a few non-limiting examples. Multiple properties might be added to a campaign group. Properties may also comprise filters, where different segments could be grabbed at different parts of the day or certain records at certain times of the day. Records may also be segmented by values (such as in the contact list or by time of day to meet compliance rules) or types of phone numbers (home phone vs. work at different times of day), for example. Values may also be added to the property, such as for a time zone property, the value might be "eastern only" or "mountain only". Each group may have the same set of campaign properties; however, each individual property may have a different value. The values of the campaign properties as well as the properties in each group are capable of being viewed and modified by a user.

Campaign sequences may be automatically generated based on the campaign group arrangement. The campaign sequence appears in the campaign sequence section 225 of FIG. 2. The campaign sequence section might display information related to the campaign groups comprising the sequence, information regarding how a campaign group is activated, and the parent group for a campaign group. For example, the campaign group 'Central' might be activated when 'Contact List Recycled' and is the child of parent group 'Eastern'. The toolbar 220 may be used to create, modify, and configure a campaign sequence.

Activation types might be used to initiate or trigger a transition from a campaign group to another campaign group. Examples of activation types might comprise a 'system event', a 'time', and a 'statistic'. A system event activation type might trigger a transition when the selected event(s) occur. Examples of system event activations might comprise: 'contact list recycled', 'campaign started', campaign stopped', 'campaign restarted', 'campaign paused', and 'campaign unpaused'. The time activation type might trigger a transition when the configured moment in time occurs. For example, a campaign may be designed to contact a different set of customers when the time of day changes to allow access to different time zones. Campaign groups may be created for each time zone targeted by the contact center, such as Eastern, Central, Mountain, and Pacific. A property, such as a zone set, may be assigned to all of the campaign groups and a user may then configure the zone set property with appropriate values based on previously created zone sets. In an example, the created zone sets might comprise 'Eastern Only', 'Central Only', 'Mountain Only', and 'Pacific Only'.

The statistic activation type might trigger a transition when the configured statistic occurs. For example, when the $100^{th}$ agent logs on to the campaign or when the $10,000^{th}$ success occurs, an action occurs, such as the next campaign may be initiated. An action may also comprise pausing or resetting the campaign sequence or the campaign group.

The activation types may be used to drive the different campaign transitions and several of the campaign groups might have more than one parent. In an embodiment, a group might be configured to use any group as a parent group. This may indicate that a campaign transition can come from any one of several parent groups, depending on which activation trigger occurs first. Control is passed to operation 110 and the process 100 continues.

Figure 3:
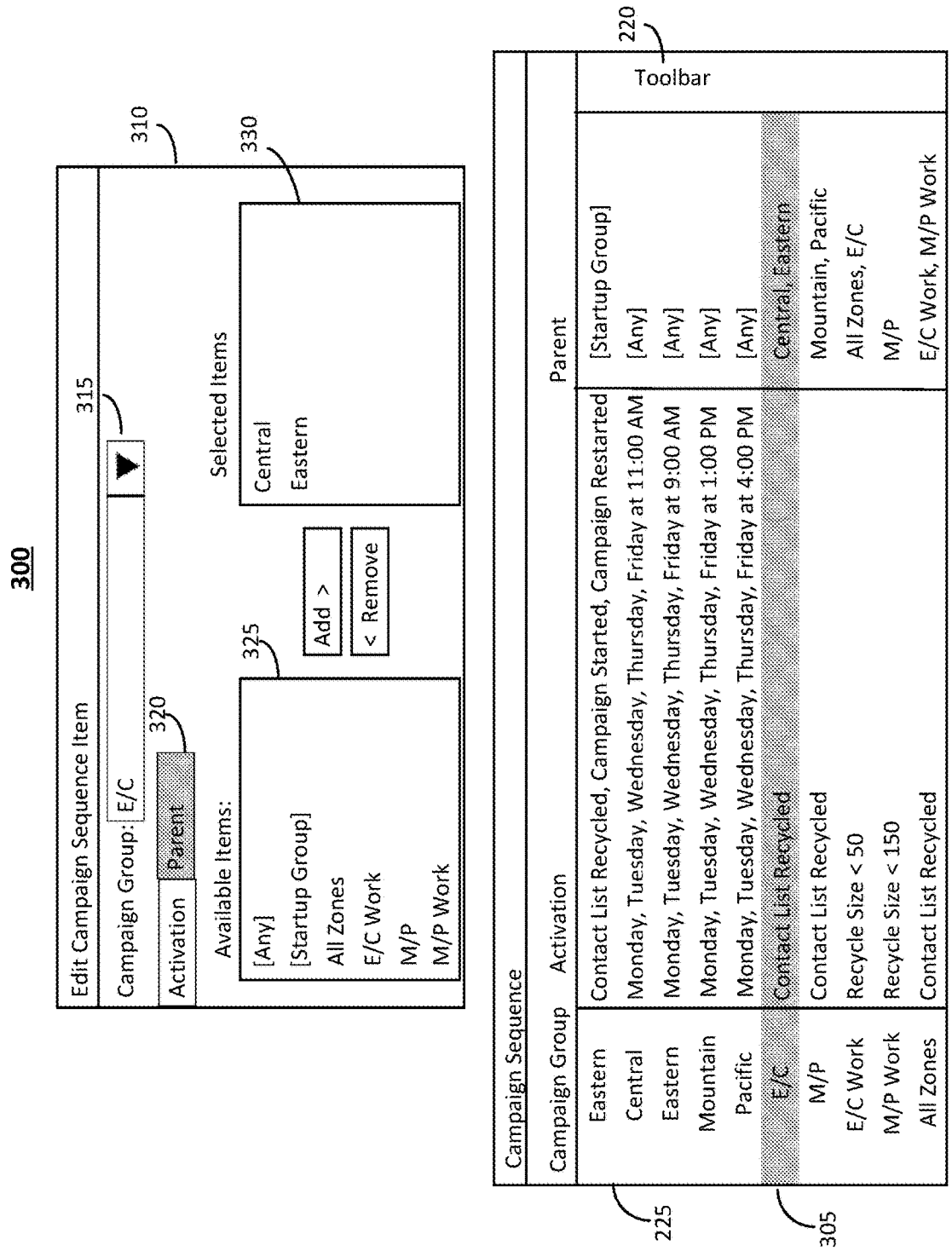
FIG. 3 is a diagram illustrating an embodiment of a campaign sequence configuration.

In operation 110, groups are arranged within a campaign sequence. For example, once the campaign groups are created and configured, they may be added by a user to a campaign sequence in any order. Condition or activation may be configured that a user desires to trigger a transition from one campaign group to the next. Groups within a campaign sequence may have different activations triggers. In an embodiment, an event activation may be configured for a campaign group and a time activation for another campaign group. The event activation may be set to occur when the campaign is started and the activation for the other campaign groups may be set to a time appropriate to each time zone. For example, if a contact center is in the Eastern time zone, the activation for the Eastern campaign group may be set to 'Campaign Stated', the activation for the central campaign group may be set to 11:00 am, the activation for the mountain campaign group may be set to 1:00 pm, and the activation for the Pacific Campaign group may be set to 4:00 pm. Additional transition paths between groups may also be created. FIG. 3 is a diagram illustrating an embodiment of a campaign sequence configuration, indicated generally at 300. Each campaign group in the campaign sequence must have a parent group to maintain a transition path. Where a group is the first group in the sequence, the parent group may be a default [Startup group] designation. In an embodiment, a group might have multiple parent groups. Configuration of the groups in the sequence may be performed through the user interface. Through the campaign sequence section 225, a user might select a campaign group. In this example, the campaign group E/C 305 is selected. Using the E/C campaign group 305 example, the activation is "contact list recycled" and the parent groups are 'Central' and 'Eastern'. Parent groups and activation may be selected in a separate section 310, which appears when a campaign group is selected. In the section 310, the campaign group E/C is indicated as having been selected 315. A drop-down menu might allow a user to toggle between campaign groups in the campaign sequence. Tabs 320 may be present, which allow a user to switch between actions for a campaign group, such as 'Activation' and 'Parent'. The 'Parent' tab has been selected, providing a user with available items 325 and selected items 330. A user can select between available items provided 325 to determine which groups to make a parent of the campaign group E/C. Groups may be selected and listed 330 for the campaign group. Here, 'Central' and 'Eastern' have been selected as parent groups for the campaign group E/C. Control is passed to operation 115 and the process 100 continues.

In operation 115, a campaign sequence is initiated. For example, the user may initiate a campaign sequence after it has been configured. As the campaign flows, different activation types may be used to trigger transitions from one campaign group to the next, such as a system event, a time activation, and a statistical activation, as previously mentioned. Control is passed to operation 120 and the process 100 continues.

In operation 120, the campaign sequence is monitored and evaluated. For example, a campaign sequence may be monitored and evaluated by the outbound dialing platform as it transitions from group to group. At any point in time, a user might be able to view details through a user interface for a running campaign sequence and immediately identify which campaign group is currently active, which campaign group previously ran, and which campaign group is next. In an embodiment, progress gauges might be used to determine when the next transition will occur.

Figure 4:
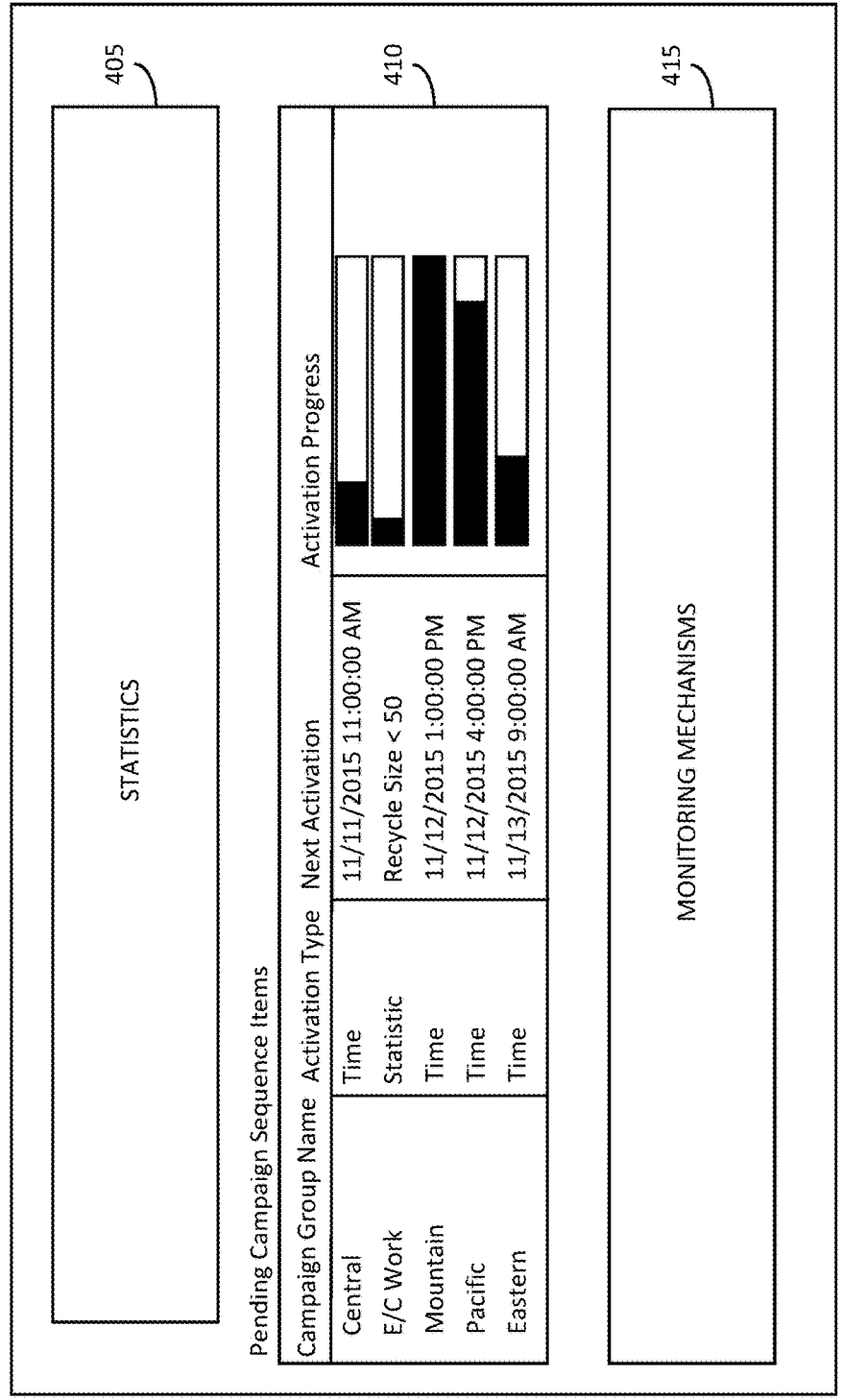
FIG. 4 is a diagram illustrating an embodiment of campaign monitoring.

FIG. 4 is a diagram illustrating an embodiment of campaign monitoring, indicated generally at 400. Details of the dialer campaign sequence may be provided to a user in a user interface, such as that generally illustrated at 400. All facets of the campaign sequence may be monitored and evaluated in real-time. A section 405 may be provided for statistics of the campaign sequences, which are updated in real-time to indicate the performance of the currently running campaign group within the sequence. A non-exhaustive list of statistics examples might comprise calls per hour, calls per agent, connected calls, total agents, active calls, status, idle agents, etc. Any type of statistic may be provided and those illustrated are intended to serve as examples. Statistics may be specific to a contact center or what an individual user prefers to monitor. They may also be provided by default and the types viewed may be altered based on user preference.

A section 410 may be provided for pending campaign sequence items. The pending campaign sequence items section 410 may illustrate campaign groups that have the potential to run next (though not necessarily in the order they are listed), based on configuration of the campaign sequence. Information provided might include the campaign group name, the activation type, when the activation may occur, and activation progress indicators. Campaign groups that have the potential to be the next active group in the sequence may be listed in the order specified in the campaign sequence, as opposed to their activation progress. Other details may be displayed related to the campaign group. For example, each campaign group's assigned activation type may also be illustrated.

In this example, the campaign group name is provided, along with the activation type, when the next activation will occur, and the activation progress, though other information might be displayed as well. The configured activation type may be shown in detail to help a user identify what could potentially trigger the next activation. In this example, the E/C Work campaign group has a statistical activation type. The next activation of this campaign group occurs when the recycle size is less than 50. Other information may also be displayed, such as progress gauges. The progress gauges may provide an approximation of when the associated activation will trigger a transition to that particular campaign group. Approximations may be used because a variety of circumstances within the campaign may influence the actual progress. For the E/C work Campaign Group, the indicator is nearing 0% activation potential. In another example, the Mountain Campaign Group is a time-based activation type. The next activation for this group occurs at a set time, which in this example is Nov. 12, 2015 at 4:00:00 PM. The activation progress is nearing 100%, meaning that it has the highest potential to run next. A variety of circumstances within the campaign may influence the actual progress of the campaign group. For example, while it appears that Mountain will be the next active campaign group based on the activation progress gauge, it is possible for the recycle size to drop below 50 before 1:00 PM, causing E/C Work to become the next active campaign group.

Indicators may also comprise gauges which may use a floating arrowhead. The floating arrow may move both forward and backward depending on circumstances within the currently running campaign sequence. Time activation progress gauges might use a bar which always moves forward as the current time approaches the time specified as the moment of activation.

A section 415 might illustrate monitoring mechanisms, such as the sequence configuration or a diagram of the sequence, depending on a user's preference. The sequence configuration and sequence diagram sections provide a user with mechanisms for monitoring the progression of the running campaign sequence in real-time. For example, the sequence configuration view might illustrate a legend provided for color coding, which illustrates the current states of the campaign groups. Examples of states might comprise those which have already ran, the group currently running, and the groups which might run next. A complete list of all campaign properties and the associated values might also be provided. In another example, the sequence diagram view might provide the user with a global view of the entire campaign sequence in real-time as the campaign sequence runs. In an embodiment, a user might hover a cursor over any campaign group node in a diagram and the color coding changes to illustrate how the sequence might play out when different campaign groups are active in the sequence.

If unanticipated conditions arise at any time during the sequence, the user has the ability to manually override the automated sequence and initiate a transition to any group in the sequence. Group transitions may be logged in history from the campaign server and include detailed information, such as what triggered the transition and when it occurred while a campaign sequence is running Data pertaining to campaign groups may be viewed separately. A user may be able to view status messages or history messages related to group transitions, including detailed information about what caused a transition and when it occurred. In an embodiment, reporting may also be generated from campaign monitoring and evaluating.

In operation 125, it is determined whether an activation trigger has occurred. If it is determined that an activation trigger has occurred, control is passed to operation 130 and the process 100 continues. If it is determined that an activation trigger has not occurred, control is passed back to operation 120 and the process 100 continues.

The determination in operation 125 may be based on any suitable criteria. For example, a threshold might be used, such as when a threshold is reached of desired parameters, such as calls per hour, calls per agent, connected calls, total agents, active calls, status, idle agents, etc. In another example, a point in time could serve as an activation trigger or an event within the system.

Different activation types may be used to trigger transitions, such as system event, time activation, and statistic activation, as previously described in greater detail. The system event activation type triggers a transition when the selected event occurs, such as 'contact list recycled', 'campaign started', campaign stopped', 'campaign restarted', 'campaign paused', and 'campaign unpaused'. A time activation type might trigger a campaign transition when the configured moment in time occurs. For example, a time may be set, such as 8:00:00 AM. This may occur every day at 8:00:00 AM, on selected days of the week (e.g. Mon-Fri), an exact date, or on a timer. A statistic activation type triggers a campaign transition when the configured statistic occurs. For example, the statistic chosen may be 'recycle size', wherein the operator is less than a set value. Intervals may be set for evaluation and the evaluation may be performed against contacts made since the start of the current campaign.

In operation 130, the transition occurs and the process 100 ends. Results from the monitoring may be used to reset or pause an existing campaign and/or begin a new campaign. At any point in time, a user may manually override the automatic transition to initiate a transition of the system through selection of the campaign and initiating the transition action. Additionally, reports may be generated which help a user track and compile information on the operation of the campaign sequences. Transitions may occur between campaign groups as described or may also occur to a new campaign sequence.

In an embodiment, if the sequence is transitioned to a new campaign sequence. The new campaign sequence may be initiated and the process 100 may occur for any number of configured campaign sequences for the dialing campaign.

More than one campaign sequences may be configured at a time by a user in operation 105, in anticipation of transitioning to one or more new campaign sequences.

In an embodiment, a user is able to control whether another user may create or modify a campaign group, modify a campaign sequence, manually transition a campaign group in a campaign sequence, and/or manually transition a campaign sequence.

In another embodiment, an import/export feature may allow the automatic import/export of a complicated group/sequence set from campaign to another as a user creates campaign sequences.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for management of outbound dialing campaigns in a contact center system, wherein the contact center system comprises an outbound dialing platform, the method comprising:
    configuring an automated dialing campaign for the outbound dialing platform, wherein a campaign sequence comprises a plurality of campaign groups, wherein each of the plurality of the campaign groups is associated with at least one campaign property, each campaign property having a value;
    initiating the campaign sequence with the outbound dialing platform, wherein the campaign sequence progresses between campaign groups;
    monitoring, by the outbound dialing platform, the value of the at least one campaign property;
    updating the value of the at least one campaign property as the campaign progresses through each group; and
    modifying the campaign sequence based on an updated value of the at least one campaign property.

2. The method of claim 1, wherein each campaign group in the plurality of campaign groups has the same campaign properties comprising the at least one campaign property.

3. The method of claim 2, wherein the at least one campaign property comprises at least one of: a time zone and a filter.

4. The method of claim 1, wherein the plurality of campaign groups are constructed on a campaign strategy, wherein the campaign strategy comprises a statistical, an event, or a time strategy.

5. The method of claim 4, wherein the campaign strategy is used to determine a transition from a first campaign sequence to a second campaign sequence.

6. The method of claim 1, wherein each campaign group in the plurality of campaign groups has one or more parent campaign groups, wherein an activation trigger initiates a transition from a parent campaign group to another campaign group based on the activation trigger.

7. The method of claim 6, wherein the activation trigger is based on at least one of: time, event, and statistics.

8. The method of claim 6, wherein the activation trigger based on time occurs when a selected event occurs.

9. The method of claim 6, wherein the activation trigger based on event occurs with a specific event.

10. The method of claim 6, wherein the activation trigger is based on statistics, wherein the activation trigger based on statistics occurs when either a configured statistic occurs or a threshold is reached.

11. The method of claim 1, wherein the progress between campaign groups is predicted based on monitoring of an active campaign group.

12. The method of claim 1 wherein the monitoring comprises evaluating intervals of the campaign sequence as the campaign sequence progresses.

13. The method of claim 1, wherein the monitoring comprises monitoring desired parameters for reaching a threshold, wherein the threshold triggers the modifying the campaign sequence.

14. The method of claim 13, wherein the desired parameters comprise at least one of: calls per hour, calls per agent, connected calls, total agents, active calls, status, a time, and idle agents.

15. The method of claim 1, wherein the monitoring comprises monitoring desired parameters for an event, wherein the event triggers the modifying the campaign sequence.

16. The method of claim 1, wherein the monitoring of the campaign sequence is displayed for a user with nodes which comprise color coding.

17. The method of claim 1, further comprising automatically pausing the campaign sequence for system events.

18. The method of claim 1, wherein the updating the value of the at least one campaign property is overridden by a user manually.

19. The method of claim 1, wherein the modifying the campaign sequence is overridden by a user manually.

* * * * *